Dec. 8, 1931.  L. O. GRANGE  1,835,296
VULCANIZING DEVICE
Filed Jan. 8, 1930  2 Sheets-Sheet 1
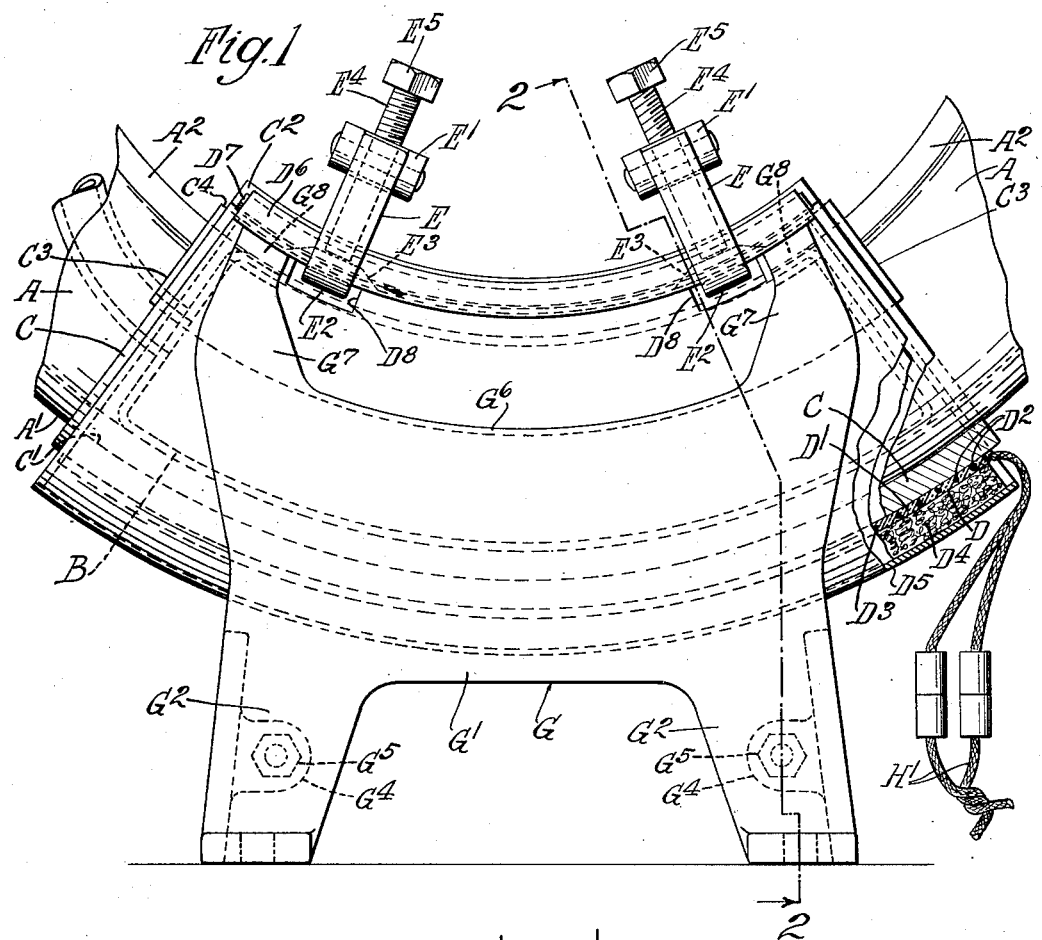
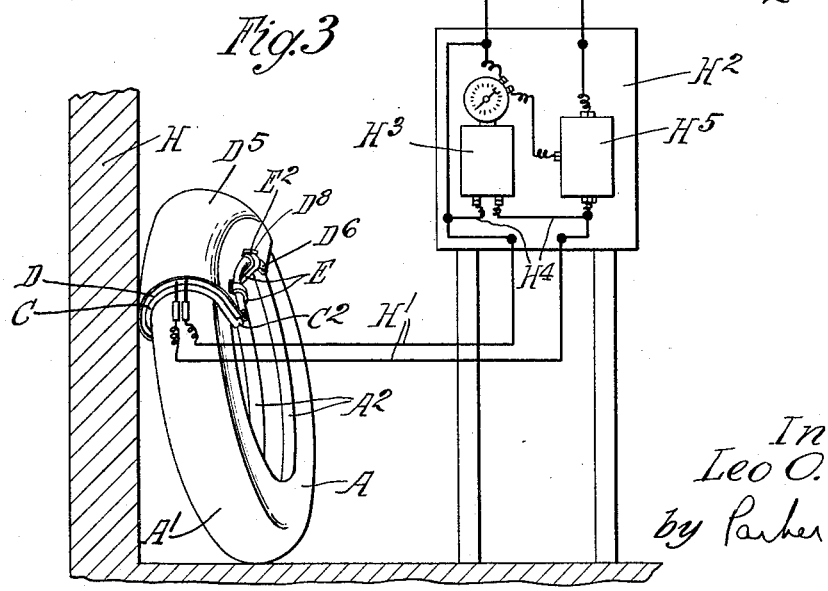
Inventor
Leo O. Grange
by Parker & Carter
Attorneys.

Dec. 8, 1931.   L. O. GRANGE   1,835,296
VULCANIZING DEVICE
Filed Jan. 8, 1930   2 Sheets-Sheet 2

Inventor
Leo O. Grange
by Parker & Carter
Attorneys.

Patented Dec. 8, 1931

1,835,296

UNITED STATES PATENT OFFICE

LEO O. GRANGE, OF CHICAGO, ILLINOIS, ASSIGNOR TO WALTER J. JARRATT, OF CHICAGO, ILLINOIS

VULCANIZING DEVICE

Application filed January 8, 1930. Serial No. 419,247.

My invention relates to a vulcanizing device and particularly to a vulcanizing device or means for vulcanizing automobile casings. One object of my invention is the provision of a vulcanizing means which is light and readily removable, but which conforms rigidly to the exterior of the tire and permits as accurate and rapid vulcanization as takes place in large and heavy fixed vulcanizers. Another object is the provision of a vulcanizer of such light weight that it may be supported upon the tire, and that it may be moved with the tire either before, during or after the vulcanizing operation. Another object is the provision of unitary means for securing a vulcanizing shell to a tire and for securing resistance heating means to the exterior of the shell. Another object is the provision of means for securing directly to and about a tire, of a vulcanizing shell, without the addition or use of a heavy fixed structure, additional castings and the like. Another object is the provision of a vulcanizing device of maximum lightness.

Other objects will appear from time to time in the course of the specification and claims.

I illustrate my invention more or less diagrammatically in the accompanying drawings, wherein—

Figure 1 is a side elevation;

Figure 3 is an elevation, with the addition of an electrical wiring diagram.

Like parts are indicated by like symbols throughout the specification and drawings.

Figure 2:
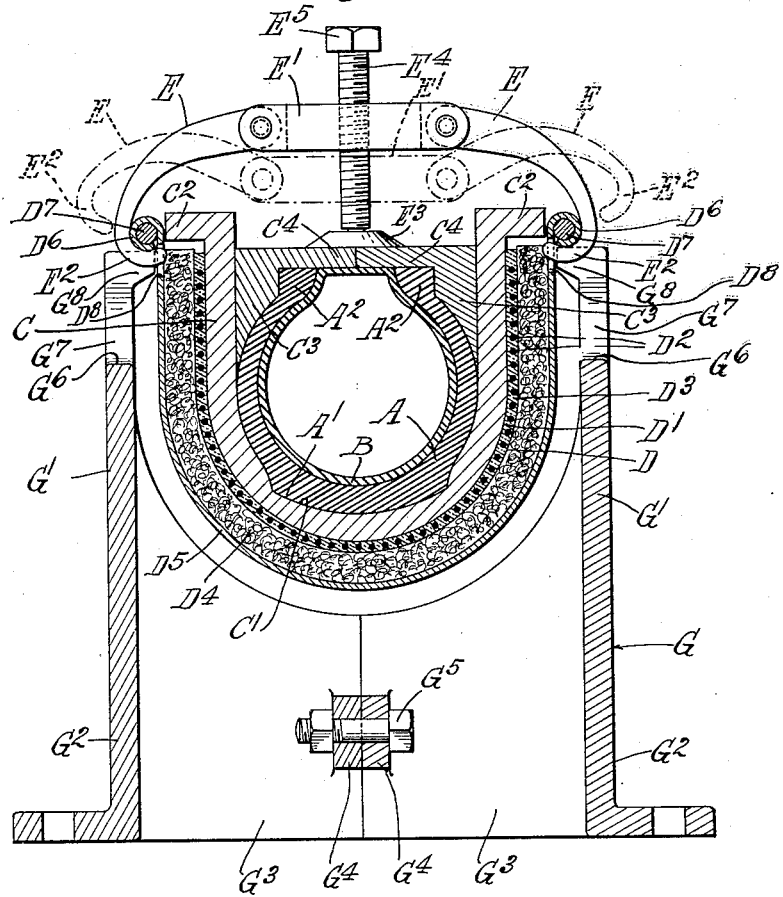
Figure 2 is a section on the line 2—2 of Figure 1.

Referring to the drawings A generally indicates a tire or casing having the tread portion $A^1$ and the bead portion $A^2$.

B indicates any suitable filler, such as an air bag, for example, which conforms to the interior of the casing, as shown in Figure 1.

C generally indicates a tire engaging form or shell, preferably of a material or metal which readily transmits heat, such for example as aluminum. It may be formed as at $C^1$ to conform to the desired tread contour of the tire being treated. It is shown as provided at its upper edges with outwardly extending flanges or abutments $C^2$. $C^3$ $C^3$ indicate closure members for the top of the shell C, which conform to the exterior of a portion of the casing, including the bead portion $A^2$, which may have laterally extending flanges $C^4$ which may meet, as shown in Figure 2.

Positioned about the exterior of the shell C, is any suitable heating means herein shown as the resistance heating pad generally indicated as D. The member D includes an inner resistance heating portion $D^1$ which includes the resistance wires $D^2$ which may be imbedded or mounted in any suitable incombustible insulating means $D^3$. Exterior to the heating element proper is a layer of heat insulating means $D^4$, adapted to drive the heat of the resistance wires directly into the shell. $D^5$ is any suitable exterior surfacing, which may be of thin and relatively flexible metal, or the like, and which is shown as terminating at its upper edges in beading or abutment members $D^6$. The beading may contain a wire $D^7$. Adjoining the beading $D^6$ the member $D^5$ may be apertured as at $D^8$ to receive the clamps below described.

In order to hold the heating pad in relation to the shell and to hold the shell and heating pad in fixed relation to the tire, I provide the following clamping means. E, E indicate arms or hooks pivoted to the opposite ends of the central member $E^1$. The hooks E include hook end portions $E^2$ adapted to penetrate the apertures $D^8$ and to surround and engage the beading members $D^6$. $E^3$ indicates a locking abutment adapted to engage the flanges $C^4$, above described. $E^4$ is a screw or compression member passing through the member $E^1$, and preferably in screwthreaded relation therewith. $E^5$ indicates any suitable square or hexagonal member, whereby the member $E^4$ may be rotated to direct compression against the locking abutment $E^3$. The result of such locking action is to draw the member $E^1$ upwardly away from the casing and to exert tension upon the members E, E, whereby the heating pad is drawn upwardly about the shell C and the shell C is locked firmly against the casing by the downward thrust of the members $C^3$ and the upward drawing movement of the hooks E. The result is the firm securing, to a casing, of a light shell, surrounded by a light heating means, the two together being of such weight as to permit the ready movement of the tire before and after the heating operation.

In the employment of the device, and in its application to a tire, it may be convenient to have a supporting means. I therefore provide a stand generally indicated as G, which includes side elements $G^1$ and supporting feet $G^2$, the supporting feet at each end being connected, if desired, by transverse connecting webs $G^3$ having the lugs $G^4$ through which may pass any suitable locking bolt or means $G^5$. The upper edge of each side member $G^1$ is shown as generally arcuate, as at $G^6$, and at a level substantially lower than the level of the flanges $C^2$, when the tire and shell are mounted on the stand. The tire is actually supported by the upward extensions $G^7$ at each end of each side member $G^1$, these upward extensions $G^7$ having inward lugs or flanges $G^8$ adapted to receive the beading $D^6$. It will be seen, as in Figure 1, that these members $G^7$ $G^8$ are preferably out of lateral alignment with the locking hooks E, whereby the tire, shell and heating member, may be conveniently supported upon the stand G, permitting ready locking and unlocking of the shell and heating means from the tire. As seen from Figure 1, more than one locking means may be employed, preferably at least two, and the low upper edge $G^6$ of each member $G^1$ permits the positioning of these various locking means without interfering with the support.

Referring to Figure 3 the tire, once the heating means has been secured thereto, may be removed from the stand G, if a number of tires are being prepared for treatment in succession and the tires may be leaned against a wall or suspended or positioned in any desired manner. Figure 3 indicates a tire leaning for example against a wall surface H. $H^1$ $H^1$ indicate flexible electric conductors extending from the heating means $D^2$ to any suitable control panel generally indicated as $H^2$. This control panel may have mounted upon it a thermostat $H^3$. For example I may employ a resistance connection $H^4$ $H^4$ through such thermostat, such resistance connection being adapted to heat the body $H^3$ of the thermostat. When the thermostat control element has reached a predetermined heat, it may operate a relay $H^5$ and break the actuating circuit through the conductors $H^1$. In such case the time and temperature of the thermostat $H^3$ is made to operate a definite relation to the desired time of treatment of the tire, or to the desired temperature to which the tire is raised. It will be understood that I do not wish to be limited to any particular governing means or control means for my resistance heating element, but the above forms a practical and convenient heat controlling means.

In the employment of my invention I may provide a considerable number of different shells C, which may be made of different sizes or of different tread tires, each individual shell being adaptable for the treatment of one particular tire or tread. I prefer to employ, with these shells, one or more heating elements, such as herein disclosed, which elements may be employed selectively with a plurality of different shells. In general a smaller number of heating elements may be necessary than the total number of shells provided. A garage might, for example, have 20 or more shells and have available for simultaneous employment only 4 or 5 heating pads. The heating pads, being relatively flexible, and being drawn up about the exterior of the shells, they may be employed with shells having a considerable variation in size. For example the pad shown in Figure 2, if used with a somewhat larger shell, might not engage the upper flanges $C^2$, but the clamping effect will still be effective, the heating pad would be firmly clamped against the exterior of the shell C, the shell itself will be firmly thrust against the exterior of the casing, and the members $C^4$, in response to the compression exerted by the screw $E^4$, would hold the casing firmly in position in the shell.

In order to permit the use of one or more heating pads or units selectively with a larger number of shells C, I may provide a plurality of shells the exterior diameter or size of which is uniform or almost uniform, while the interior may be varied in radius as well as in contour to fit and treat various sizes and shapes of tire. This dispenses with the necessity of employing adaptors or separate and removable inner or supplemental shell elements.

Where but a single tire is employed at a time, it may be left in the stand G for treatment, or several stands may be employed, to receive simultaneous treatment of several tires without the necessity of their removal. But where a large number of tires are being simultaneously or successively treated, it is a convenience to be able to lift the tires from the stand and suspend them upon or lean them against their supports, thus freeing the stands G for the primary task of initially supporting the shells and heating means while the tires are being fixed thereto.

It will be realized that whereas I have described and shown a practical and operative device, nevertheless many changes might be made in the size, shape, number and disposition of parts without departing from the spirit of my invention. I therefore wish my description and drawings to be taken as in a broad sense illustrative and diagrammatic rather than as limiting me to my specific showing.

I claim:

1. In a vulcanizing device for automobile tires, an interior support for such a tire, a relatively thin heat conducting shell adapted to conform to the exterior of the tire, a flexible and freely removable resistance heating means for the exterior of said shell and unitary means for clamping said shell about and against said tire and for clamping said resistance heating means to the exterior of said shell.

2. The structure of claim 1 characterized by the employment of a support adapted removably to receive said vulcanizing device.

3. The structure of claim 1 characterized by the employment of outwardly extending flanges along the upper edges of said shell adapted to engage the upper edges of said resistance heating means.

4. In a vulcanizing device for automobile tires, an interior support for such tire, a relatively thin heat conducting shell adapted to conform to the exterior of said tire, bead plates positioned within said shell and adapted to overlie said tire, a flexible and freely removable resistance heating means about the exterior of said shell and unitary means for thrusting said bead plates downwardly against the tire, for drawing the shell upwardly against the tire, and for clamping said resistance heating means to the exterior of said shell.

5. The structure of claim 4 characterized by the provision of abutment means at the upper edge of said resistance heating means, clamping means adapted to engage said abutment means and a clamp element adapted to draw said clamping means upwardly and to thrust said bead plates downwardly, in relation to the tire.

6. In a vulcanizing device for automobile tires, a relatively thin heating conducting shell, said shell having an interior cavity adapted to conform to the desired profile or surface of the tire to be vulcanized, a resistance heating element adapted to be positioned in intimate contact with the exterior of said shell, freely removable therefrom, unitary means for securing said shell about said tire and for securing said heating means about said shell, said means including an exterior flexible tension member adapted to surround shell and heating means, and means for drawing said flexible tension member about said heating means and shell, including outward projections at the upper edges of the tension member, a clamp element adapted to engage said outward projections, and compression means interposed between said clamp element and the tire, adapted to apply tension to the edges of the tension member and to cause compression of said tension member against and about said shell and heating means.

Signed at Chicago, county of Cook and State of Illinois, this 2nd day of January 1930.

LEO O. GRANGE.